(12) United States Patent
Ikenaka

(10) Patent No.: US 7,706,237 B2
(45) Date of Patent: Apr. 27, 2010

(54) OBJECTIVE LENS AND OPTICAL PICKUP APPARATUS

(75) Inventor: Kiyono Ikenaka, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 694 days.

(21) Appl. No.: 11/597,889

(22) PCT Filed: May 24, 2005

(86) PCT No.: PCT/JP2005/009403

§ 371 (c)(1),
(2), (4) Date: Nov. 29, 2006

(87) PCT Pub. No.: WO2005/119668

PCT Pub. Date: Dec. 15, 2005

(65) Prior Publication Data

US 2007/0242591 A1  Oct. 18, 2007

(30) Foreign Application Priority Data

Jun. 3, 2004  (JP)  .............................. 2004-166301

(51) Int. Cl.
*G11B 7/00* (2006.01)
(52) U.S. Cl. .............................. 369/112.23; 369/112.08
(58) Field of Classification Search ................................
369/112.03–112.08, 112.23, 112.24, 44.23, 369/94
See application file for complete search history.

(56) References Cited

U.S. PATENT DOCUMENTS

| 6,870,805 B1* | 3/2005 | Arai et al. ............... 369/112.07 |
| 6,950,384 B2* | 9/2005 | Arai et al. ............... 369/112.01 |
| 7,206,276 B2* | 4/2007 | Kimura et al. ......... 369/112.08 |
| 7,260,047 B2* | 8/2007 | Nishioka et al. ....... 369/112.05 |
| 7,411,883 B2* | 8/2008 | Kimura et al. ......... 369/112.03 |
| 2004/0114254 A1 | 6/2004 | Kimura et al. |
| 2004/0213135 A1* | 10/2004 | Mori et al. ............. 369/112.15 |

FOREIGN PATENT DOCUMENTS

| JP | 2002-298422 | 10/2002 |
| JP | 2004-030724 | 1/2004 |
| JP | 2004-062971 | 2/2004 |
| JP | 2004-071134 | 3/2004 |

\* cited by examiner

*Primary Examiner*—Thang V Tran
(74) *Attorney, Agent, or Firm*—Finnegan, Henderson, Farabow, Garrett & Dunner, L.L.P.

(57) ABSTRACT

An objective lens is provided for an optical pickup apparatus at least reproducing information for a first optical disc, and recording and/or reproducing information for second and a third optical discs. The objective lens includes an optical surface including a common area including a diffractive structure having a cross section in a serrated shape and divided into a plurality of ring-shaped zones. Refractive index differences between media arranged at both side of the optical surface for a light flux with one and the other wavelength satisfy a predetermined condition, and the objective lens satisfies a predetermined conditions defined by using an approximate coefficient which makes a Pearson's correlation coefficient R satisfy $0.99998 \leq R$ when a depth parallel to the optical axis of step differences between the ring-shaped zones at a vertical distance from the optical axis is approximated by a least squares method.

26 Claims, 4 Drawing Sheets

OBJECTIVE LENS AND OPTICAL PICKUP APPARATUS

TECHNICAL FIELD

The present invention relates to an objective lens and a pickup apparatus.

BACKGROUND ART

In recent years, there has been advanced a trend towards a shorter wavelength of a laser light source used as a light source for reproducing of information recorded on an optical disc and for recording information on an optical disc, and a laser light source with a wavelength of 405 nm such as, for example, a violet semiconductor laser or a violet SHG laser that conducts wavelength conversion of an infrared semiconductor laser by utilizing second harmonic generation has been put to practical use.

When these violet laser light sources are used, information in volume of 15-20 GB can be recorded on an optical disc having a diameter of 12 cm, in the case of using an objective lens having a numerical aperture (NA) identical to that of a digital versatile disc (hereinafter referred to as DVD for short), and information in volume of 23-27 GB can be recorded on an optical disc having a diameter of 12 cm, in the case of enhancing NA of the objective lens to 0.85. Hereafter, an optical disc employing a violet laser light source and a magnetic optical disc are called "high density optical disc" generically in the present specification.

Incidentally, as a high density optical disc, there are proposed two standards at present. One of them is Blu-Ray disc (hereinafter referred to as BD for short) that uses an objective lens with NA 0.85 and has a protective layer whose thickness is 0.1 mm, and the other is HD DVD (hereinafter referred to as HD for short) that uses an objective lens with NA 0.65-0.67 and has a protective layer whose thickness is 0.6 mm. When considering possibility of circulation of these two high density optical discs in the two standards on the market, compatible optical pickup apparatuses which can conduct recording and/or reproducing for not only existing DVD and CD but also for all types of high density optical discs are important, and a one-lens system that is compatible by using a common objective lens for a high density disc, DVD and CD amount them is most ideal.

With respect to an optical pickup apparatus having compatibility for plural types of optical discs, there have been known technologies to change a degree of divergence for a light flux entering an objective optical system or to provide a diffractive structure on an optical surface of an optical element constituting an optical pickup apparatus, as a method of correcting spherical aberration caused by differences in a light flux wavelength and a protective layer thickness used in respective optical discs (for example, see Patent Document 1).

However, when achieving compatibility for BD, HD DVD and CD, coma of an objective lens caused by its tracking is great, and preferable recording signals and reproducing signals cannot be obtained accordingly, when trying to achieve compatibility only by a method to change a degree of divergence of a light flux entering an objective optical system (hereinafter referred to as an objective lens), because a difference of substrate between respective optical discs is great. On the other hand, when trying to achieve compatibility by providing a diffractive structure on an optical element and by utilizing diffracting effects, high amount of light of 90% or more cannot be obtained because of a wavelength ratio of violet laser light used for high density disc to infrared laser light used for CD. Further, since wavelength dependency of the diffractive structure is determined by the design for achieving compatibility, if a wavelength of each incident light entering an objective lens is varied or changed, wavefront aberration is affected.

Patent Document 1: TOKUKAI No. 2002-298422

The invention described in Patent Document 1 is one to record and reproduce information for respective optical discs by making optical system magnification of the objective lens for each of plural types of optical discs to be 0. In this method, however, a change in wavelength characteristic caused by diffracting effects grows greater, and wavefront aberration is worsened, when an oscillation wavelength is varied among laser lots, although coma is hardly generated by lens shifting in the course of tracking, which is a problem. Further, there is a problem that an objective lens seems most likely to be designed giving top priority to the high density disc, and light utilization efficiency for the lowest density optical disc is insufficient, although light utilization efficiency for CD representing an optical disc of lowest density is improved. Therefore, it is difficult to realize higher speed of recording and reproducing information for the lowest density optical disc which is more specifically CD, which is a problem.

Further, when the technology disclosed in the Patent Document 1 is applied as it is, there are problems that an increase of manufacturing cost for optical pickup apparatuses and worsening efficiency of manufacturing operations are caused.

DISCLOSURE OF INVENTION

In view of the problems mentioned above, an objective of the invention is to provide an objective lens wherein the light utilization efficiency for the lowest density optical disc is improved to be easily applied to an optical pickup apparatus capable of recording or reproducing at high speed, then, different optical discs of three types or more including a high density disc can be handled compatibly, and excellent wavelength characteristics and tracking characteristics are provided, and to provide an optical pickup apparatus employing the objective lens.

To solve the above problems, a structure described in Item 1 is an objective lens for an optical pickup apparatus at least reproducing information using a light flux with a wavelength λ1 emitted from a first light source for a first optical disc having a protective substrate with a thickness t1, recording and/or reproducing information using a light flux with a wavelength λ2 (1.5×λ1≦λ2≦1.7×λ1) emitted from a second light source for a second optical disc having a protective substrate with a thickness t2, and recording and/or reproducing information using a light flux with a wavelength λ3 (1.8×λ1≦λ3≦2.2×λ1) emitted from a third light source for a third optical disc having a protective substrate with a thickness t3 (1.9×t1≦t3≦2.1×t1). The objective lens includes: at least one optical surface including a common area for reproducing information for the first disc and for recording and/or reproducing information for the second and third discs; and a diffractive structure arranged on the common area, having a cross section in a serrated shape and divided into a plurality of ring-shaped zones whose centers are on an optical axis. When the optical surface including the diffractive structure forms a border, a refractive index difference $n_{d1}$ for a light flux with the wavelength λ1 between a medium A arranged at a light source side of the optical surface and a medium B arranged at an optical disc side of the optical surface, and refractive index difference $n_{d2}$ for a light flux with the wavelength λ2 between the medium A and the medium B satisfies $$57 \leq |(n_{d2}-n_{d1})/(\lambda 2-\lambda 1)| \leq 90.$$

When the plurality of ring-shaped zones have step differences between every pair of the ring-shaped zones each having a depth di [mm] parallel to an optical axis and a vertical distance hi [mm] from the optical axis, the objective lens satisfies any one of:

$$3.38 \leq \alpha \leq 3.45,$$

$$5.37 \leq \alpha \leq 5.46,$$

$$7.25 \leq \alpha \leq 7.39,$$

$$9.38 \leq \alpha \leq 9.45, \text{ and}$$

$$11.41 \leq \alpha \leq 11.43,$$

where $\alpha$ is defined by $\alpha = C_0 \times |n_{d1}/\lambda 1|$ using an approximate coefficient $C_0$ which makes a Pearson's correlation coefficient R satisfy $0.99998 \leq R$ when for the step differences whose number m satisfies m>7 arranged between every pair of the ring-shaped zones, a depth d parallel to the optical axis at a vertical distance hi from the optical axis is approximated by a least squares method using a following expression (1) to obtain $C_{2k}$ (k is an integer in a range of 0 to 5) and is determined by using $C_{2k}$, and a whole of the step differences except step differences providing maximum and minimum differences between a calculated value of the depth d parallel to the optical axis at the vertical distance hi from the optical axis and di, are approximated again using the expression (1). Wherein for the step differences whose number m satisfies $m \leq 7$ arranged between every pair of the ring-shaped zones, when the depth d parallel to the optical axis at a vertical distance hi from the optical axis is determined, $C_{2k}$ (k is an integer in a range of 0 to m−3) is obtained by approximating by the least squares method using a following expression (2) instead of the expression (1), and wherein when a number of the calculated values of the depth d parallel to the optical axis at a vertical distance hi from the optical axis is 3 or less, a whole of the step differences including the step differences providing the maximum and minimum differences between the calculated value of the depth d parallel to the optical axis at a vertical distance hi from the optical axis and di, are approximated again.

$$di = \sum_{k=0}^{5} (C_{2k} \cdot h_i^{2k})(i=1,2,3\ldots m) \quad (1)$$

$$di = \sum_{k=0}^{m-3} (C_{2k} \cdot h_i^{2k})(i=1,2,3\ldots m) \quad (2)$$

Where, $C_{2k}$ is a constant, k is an integer, i is a natural number, and m is a number of the step differences between every pair of the ring-shaped zones.

In a structure described in Item 2, according to the objective lens of Item 1, $\alpha$ has an integer part of 3.

A diffractive structure formed on an optical surface of the objective lens is a structure to correct spherical aberration caused by a thickness difference in the first, second and third optical discs, and/or wavefront aberration caused by changes in refractive index of the objective lens resulted from changes in ambient temperature and in oscillation wavelength.

By setting $\alpha$ to either one of the aforesaid ranges as in the structure described in Item 1, in the objective lens having characteristics of $(n_{d2}-n_{d1})/(\lambda 2-\lambda 1)$, the diffraction efficiency arrives at 50% or more for the first optical disc and at 70% or more for the third optical disc, and sufficient amount of light can be secured as a use for exclusive reproduction of information for the high density optical disc as the first optical disc, and sufficient amount of light of the second light flux and the third light flux for reproducing and/or recording of information for DVD and CD representing respectively the second optical disc and the third optical disc.

Further, the diffractive structure includes a plurality of ring-shaped zones 100 in terms of a shape as shown typically in FIGS. 1(*a*) and 1(*b*), and a sectional form including an optical axis is serrated. Incidentally, though each of FIGS. 1(*a*) and 1(*b*) shows typically an example where a diffractive structure is formed on a plane, the diffractive structure may also be formed on a spherical surface or on an aspheric surface. In the mean time, in the present specification, it is assumed that symbol "DOE" represents a diffractive structure including plural ring-shaped zones shown in FIGS. 1(*a*) and 1(*b*). With respect to this diffractive shape, a width of each ring-shaped zone in the vertical direction from the optical axis is determined to correct the aforesaid wavefront aberration, and a depth of each ring-shaped zone that is in parallel to the optical axis is determined for the diffraction efficiency for each of light fluxes having respectively wavelengths λ2 to λ3.

In the present specification, when a thickness of a coating layer in the direction parallel with an optical axis is smaller than a depth of each ring-shaped zone being in parallel with the optical axis, a coating layer such as an antireflection coating given to the lens is not included in medium A and medium B. However, when a thickness of a coating layer that is in parallel with an optical axis is greater than a depth of each ring-shaped zone that is in parallel with an optical axis, a coating layer is also included in medium A or medium B. The reason for this is that a phase given to incident light by a depth of diffractive ring-shaped zone is dependent on the refractive index of the coating layer.

When the diffractive structure is set so that an integer part of $\alpha$ may be an odd number, as in the structure described in Items 1 and 2, it provides the light flux with wavelength λ1 an optical path difference that is substantially a multiple of an odd number of the wavelength, and it generates mainly $N^{th}$ order diffracted light and $(N-1)^{th}$ order diffracted light which are substantially the same in terms of diffraction efficiency from the light flux with wavelength λ3 ($1.8\times\lambda 1 \leq \lambda 3 \leq 2.2\times\lambda 1$) entering the aforesaid diffractive structure. Here, when an example that $N^{th}$ order diffracted light having smaller spherical aberration at the magnification identical to optical system magnification m1 of the objective lens for the light flux with wavelength λ1 is used for reproducing and/or recording for the third optical disc is compared with an example that distance d of a step difference is established so as to provide the light flux with wavelength λ1 an optical path difference that is substantially a multiple of an even number of the wavelength, and the diffracted light having the maximum diffraction efficiency among light fluxes with wavelength λ3 generated in the course of passing through this diffractive structure is used for reproducing and/or recording, in these two diffracted lights, the optical system magnification for correcting spherical aberration is closer to 0 and aberration caused in the course of tracking can be made smaller in the former than in the latter.

Meanwhile, from the viewpoint of prevention of a decline of the diffraction efficiency in the course of wavelength fluctuations, the lower order of diffraction for the diffracted light is preferable, and if an integer part of α is made to be 3 as in Item 2, the optical system magnification of the objective lens for the first and second optical discs becomes zero substantially, and performance for coma in the course of tracking, temperature characteristics and wavelength characteristics turn out to be excellent.

Further, a structure described in Item 16 is an objective lens for an optical pickup apparatus, at least reproducing information using a light flux with a wavelength λ1 emitted from a first light source for a first optical disc having a protective substrate with a thickness t1, recording and/or reproducing information using a light flux with a wavelength λ2 ($1.5 \times \lambda1 \leq \lambda2 \leq 1.7 \times \lambda1$) emitted from a second light source for a second optical disc having a protective substrate with a thickness t2, and recording and/or reproducing information using a light flux with a wavelength λ3 ($1.8 \times \lambda1 \leq \lambda3 \leq 2.2 \times \lambda1$) emitted from a third light source for a third optical disc having a protective substrate with a thickness t3 ($1.9 \times t1 \leq t3 \leq 2.1 \times t1$). The objective lens includes: at least one optical surface having a common area for reproducing information for the first disc and for recording and/or reproducing information for the second and third discs; and a diffractive structure arranged on the common area whose diffraction efficient of the light flux with a wavelength λ1 for the first optical disc is 50% or more, and whose diffraction efficiency of a light flux with the wavelength λ2 for the second optical disc is 70% or more.

In the present specification, it is assumed that the high density optical disc includes an optical disc having, on its information recording surface, a protective layer with a thickness of about several nanometers—several tens of nanometers and an optical disc having a protective layer or a protective film whose thickness is 0 (zero), in addition to the aforesaid BD and HD.

In the present specification, DVD is a generic name of optical discs of DVD series such as DVD-ROM, DVD-Video, DVD-Audio, DVD-RAM, DVD-R, DVD-RW, DVD+R and DVD+RW, and CD is a generic name of optical discs of CD series such as CD-ROM, CD-Audio, CD-Video, CD-R and CD-RW.

BRIEF DESCRIPTION OF THE DRAWINGS

Each of FIGS. 1(*a*) and 1(*b*) shows a diffractive structure.

BEST MODE FOR CARRYING OUT THE INVENTION

Figure 1A:
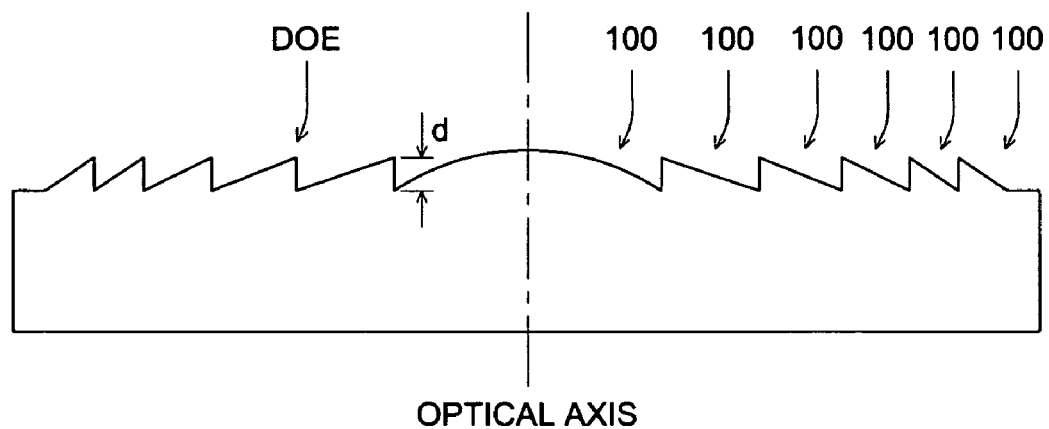
Figure 1B:
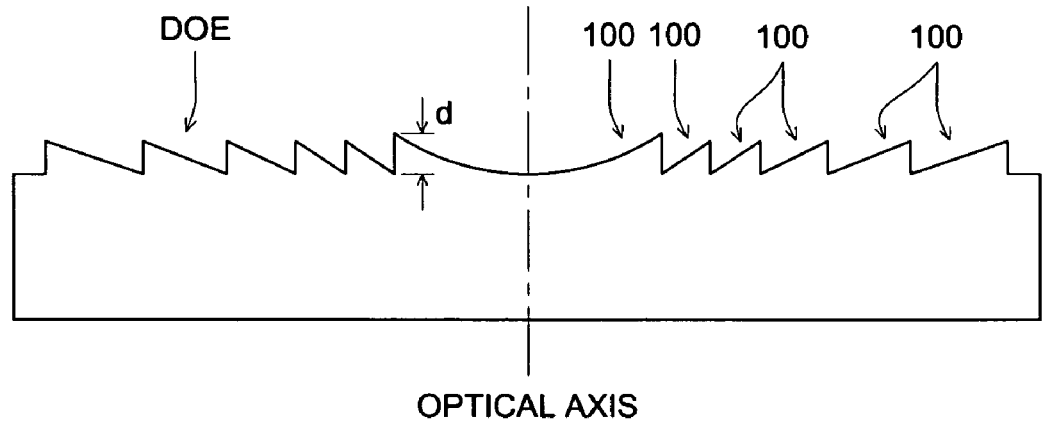

Preferred embodiments of the invention will be explained as follows.

In a structure described in Item 3, according to the objective lens described in any one of Items 1 and 2, the objective lens is formed of two lenses.

A structure described in Item 4, according to the objective lens described in Item 3, is characterized in that the diffractive structure is on a lens arranged at a light source side between the two lenses.

In a structure described in Item 5, according to the objective lens described in any one of Items 1 to 4, the objective lens satisfies $60 \leq |(n_{d2}-n_{d1})/(\lambda2-\lambda1)| \leq 80$.

A structure described in Item 6, according to the objective lens described in any one of Items 1 to 5, is characterized in that the diffractive structure is defined by using an optical path difference function φ(h) where $$\phi(h) = B_2 \times h^2 + B_4 \times h^4 + \ldots + B_{2i} \times h^{2i}, \text{ and}$$

$$B_4 < 0.$$

Where, $B_{2i}$ is a coefficient of the optical path difference function and i is a natural number.

When coefficient $B_4 < 0$ is made to hold as in the structure described in Item 6, the diffractive structure results in having positive diffractive functions, and spherical aberration caused by the diffractive functions in the case of temperature changes can be canceled with the diffractive functions by changing an oscillation wavelength of a laser (light source).

Since the diffracted light with wavelength λ1 generated by passing through the diffractive structure has a diffraction efficient with the opposite sign to spherical aberration caused in the course of changes in wavelength depending on lens material, it is possible to correct spherical aberration characteristics in the case of wavelength change and temperature change. Since an amount of spherical aberration in the case of wavelength change and temperature change is proportional to the fourth power of NA, it is more effective if this technology is used for BD having higher NA.

Incidentally, to keep balance between wavelength characteristics and temperature characteristics, it is preferable to make coefficient $B_4$ to be within a range of $-1.0 \times 10^{-3} < B_4 < -1.0 \times 10^{-4}$, and it is more preferable to make coefficient $B_4$ to be within a range of $-7.0 \times 10^{-4} < B_4 < -4.5 \times 10^{-4}$, when a material of the objective lens is an ordinary optical resin such as, for example, "ZEONEX340R" (product name) of ZEON Corporation or "APEL" (product name) of Mitsui Chemicals, Inc.

In a structure described in Item 7, according to the objective lens described in any one of Items 1 to 6, the diffractive structure has a negative diffraction power.

By providing the negative diffraction power as described in Item 7, chromatic aberration in the light flux with the wavelength λ1 or λ2 when recording and/or reproducing of information for the first optical disc and the second optical disc is conducted, can be corrected well.

In a structure described in Item 8, according to the objective lens described in Item 7, a change amount of a position dfb/dλ where a wavefront aberration is minimum along the optical axis in the objective lens for a light flux with the wavelength λ1 per a wavelength change of 1 nm satisfies $$|dfb/d\lambda| \leq 0.1 \ [\mu m/nm].$$

Where, fb is a distance between the objective lens and the first optical disc.

A structure descried in Item 9, according to the objective lens of Item 7, a change amount of a position dfb/dλ where a wavefront aberration is minimum along the optical axis in the objective lens for a light flux with the wavelength λ1 per a wavelength change of 1 nm satisfies $$|dfb/d\lambda| \leq 0.1 \ [\mu m/nm].$$

Where, fb is a distance between the objective lens and the first optical disc.

Meanwhile, in the aforesaid structure, it is preferable that at least one of optical system magnifications m1, m2 and m3 of the aforesaid objective lens for light fluxes respectively with wavelengths λ1, λ2 and λ3 is not 0 in the objective lens described in any one of Items 1 to 9.

Further, it is more preferable that the aforesaid magnification which is not 0 is not less than $-1/10$ and is less than $-1/100$, in the aforesaid objective lens.

As stated above, by setting so that an optical system magnification on at least one side among optical system magnifications m1, m2 and m3 may not be 0 (preferably, within a range from $-1/10$ or more to less than $-1/100$), compatibility for the first, second the third optical discs is shared by diffractive functions and magnification changes, whereby, wavelength-dependency of diffractive functions does not become too great and no problem is caused for operations even in the case where wavelength only changes like fluctuations of oscillation wavelength between laser lots.

Further, coma caused in the case of tracking of the objective lens results in optical system magnification at the level which makes reproducing and/or recording to be possible.

In a structure described in Item 10, according to the objective lens described in any one of Items 1 to 9, among optical system magnifications m1, m2, and m3 of the objective lens for the wavelength λ1, λ2 and λ3, m1=0 and at least one of m2 and m3 satisfies a following expression.

$$1/100 < |m| \le 1/10.$$

As descried in Item 10, by setting so that m1 among optical system magnifications m1, m2 and m3 is zero, and at least one of optical system magnifications m2 and m3 satisfies the relation of $1/100 < |m| \le 1/10$, compatibility of the first optical disc, the second optical disc and the third optical disc is shared by diffractive actions and by magnification changes, whereby, wave-dependency of the diffractive actions does not grow too great, and no problem is caused for operations, even in the case of changes of only waves such as fluctuations of oscillation wavelengths between laser lots. Further, coma caused in the course of tracking of an objective lens becomes an optical system magnification on the level capable of reproducing and/or recording. In particular, it is possible to improve reproducing capability of information for the first optical disc that employs a light flux with wavelength λ1 that is a smallest wavelength.

A structure described in Item 11, according to the objective lens described in any one of Items 1 to 10, satisfies t1=t2.

In the structure described in Item 11, only spherical aberration caused by chromatic aberration for each of wavelength λ1 and wavelength λ2 has only to be corrected, for attaining compatibility between the first optical disc and the second optical disc, whereby, it is possible to reduce both a difference between optical system magnifications m1 and m2 and wavelength-dependency of diffractive actions.

In the aforesaid structure, it is preferable that NA1 is equal to NA2, when NA1 represents an image side numerical aperture of the objective lens for the aforesaid wavelength λ1 and NA2 represents an image side numerical aperture of the objective lens for the aforesaid wavelength λ2, in the objective lens described in any one of Items 1 to 10.

In the present embodiment, a difference of effective diameters of objective lenses for conducting reproducing and/or recording for the first optical disc and the second optical disc is small, and it is not necessary to provide an aperture restriction individually accordingly.

In the aforesaid structure, it is preferable that an aperture restriction element is provided on the optical path for a light flux with the wavelength λ3 and between the third light source and the objective lens, in the objective lens described in any one of Items 1 to 10.

The present structure makes it possible to conduct aperture restriction for the light flux with wavelength λ3.

In the aforesaid structure, it is preferable that a chromatic aberration correcting element having functions to correct chromatic aberration for a passing light flux is provided on at least one of an optical path for a light flux with wavelength λ1 and an optical path for a light flux with wavelength λ2, in the objective lens described in any one of Items 1 to 10.

It is further preferable that the chromatic aberration correcting element is a collimator lens in the aforesaid objective lens.

In the aforesaid structure, even in the case where chromatic aberration can be corrected by an objective lens only for the light flux on one side among two light fluxes respectively with wavelength λ1 and wavelength λ2, chromatic aberration can be corrected by the chromatic aberration element also for the wavelength on the other side. As this chromatic aberration correcting element, there is given, for example, a collimator lens.

In a structure described in Item 12, according to the objective lens described in any one of Items 1 to 11, a focal length f1 of the objective lens for a light flux with the wavelength λ1 satisfies 0.8 mm≤f1≤4.0 mm.

In a structure described in Item 13, according to the objective lens described in any one of Items 1 to 12, the objective lens is formed of a plastic.

In a structure described in Item 14, according to the objective lens described in any one of Items 1 to 20, the objective lens satisfies 0.9×t1≤t2≤1.1×t1.

In a structure described in Item 15, according to the objective lens described in any one of Items 1 to 14, one of the medium A and medium B is an air and the other is a lens material of the lens including the diffractive structure.

In a structure described in Item 17, according to the objective lens described in Item 16, the diffractive structure has a cross section in a serrated shape is divided into a plurality of ring-shaped zones whose centers are on an optical axis.

In a structure described in Item 18, according to the objective lens described in Item 16 or 17, when the optical surface including the diffractive structure forms a border, a refractive index difference $n_{d1}$ for a light flux with the wavelength λ1 between a medium A arranged at a light source side of the optical surface and a medium B arranged at an optical disc side of the optical surface, and refractive index difference $n_{d2}$ for a light flux with the wavelength λ2 between the medium A and the medium B satisfy $$57 \le |(n_{d2}-n_{d1})/(\lambda2-\lambda1)| \le 90.$$

In a structure described in Item 19, according to the objective lens described in Item 17, when the plurality of ring-shaped zones have step differences between every pair of the ring-shaped zones each having a depth di [mm] parallel to an optical axis and a vertical distance hi [mm] from the optical axis, the objective lens satisfies any one of:

3.38≤α≤3.45, 5.37≤α≤5.46, 7.25≤α≤7.39, 9.38≤α≤9.45, and 11.41≤α≤11.43, where α is defined by $\alpha = C_0 \times |n_{d1}/\lambda1|$ using an approximate coefficient $C_0$ which makes a Pearson's correlation coefficient R satisfy $0.99998 \leq R$ when for the step differences whose number m satisfies $m>7$ arranged between every pair of the ring-shaped zones, a depth d parallel to the optical axis at a vertical distance hi from the optical axis is approximated by a least squares method using a following expression (1) to obtain $C_{2k}$ (k is an integer in a range of 0 to 5) and is determined by using $C_{2k}$, and a whole of the step differences except step differences providing maximum and minimum differences between a calculated value of the depth d parallel to the optical axis at the vertical distance hi from the optical axis and di, are approximated again using the expression (1). Wherein for the step differences whose number m satisfies $m \leq 7$ arranged between every pair of the ring-shaped zones, when the depth d parallel to the optical axis at a vertical distance hi from the optical axis is determined, $C_{2k}$ (k is an integer in a range of 0 to m−3) is obtained by approximating by the least squares method using a following expression (2) instead of the expression (1), and wherein when a number of the calculated values of the depth d parallel to the optical axis at a vertical distance hi from the optical axis is 3 or less, a whole of the step differences including the step differences providing the maximum and minimum differences between the calculated value of the depth d parallel to the optical axis at a vertical distance hi from the optical axis and di, are approximated again.

$$di = \sum_{k=0}^{5}(C_{2k} \cdot h_i^{2k})(i = 1, 2, 3 \ldots m) \quad (1)$$

$$di = \sum_{k=0}^{m-3}(C_{2k} \cdot h_i^{2k})(i = 1, 2, 3 \ldots m) \quad (2)$$

Where, $C_{2k}$ is a constant, k is an integer, i is a natural number, and m is a number of the step differences between every pair of the ring-shaped zones.

In a structure described in Item 20, according to the objective lens described in Item 19, α has an integer part of 3.

In a structure described in Item 21, according to the objective lens described in any one of Items 16 to 19, the objective lens is formed of two lenses.

In a structure described in Item 22, according to the objective lens described in Item 21, the diffractive structure is on a lens arranged at a light source side between the two lenses.

In a structure described in Item 23, according to the objective lens described in any one of Items 18 to 22, the objective lens satisfies $60 \leq |(n_{d2}-n_{d1})/(\lambda 2-\lambda 1)| \leq 80$.

A structure described in Item 24, according to the objective lens described in any one of Items 1 to 15, includes: a first light source for reproducing information using a light flux with a wavelength $\lambda 1$ emitted from the first light source for a first optical disc having a protective substrate with a thickness t1; a second light source for recording and/or reproducing information using a light flux with a wavelength $\lambda 2$ ($1.5 \times \lambda 1 \leq \lambda 2 \leq 1.7 \times \lambda 1$) emitted from the second light source for a second optical disc having a protective substrate with a thickness t2; a third light source for recording and/or reproducing information using a light flux with a wavelength $\lambda 3$ ($1.8 \times \lambda 1 \leq \lambda 3 \leq 2.2 \times \lambda 1$) emitted from the third light source for a third optical disc having a protective substrate with a thickness t3 ($1.9 \times t1 \leq t3 \leq 2.1 \times t1$); and the objective lens described in any one of Items 16 to 23.

A structure described in Item 25, according to the objective lens described in any one of Items 16 to 23, includes: a first light source for reproducing information using a light flux with a wavelength $\lambda 1$ emitted from the first light source for a first optical disc having a protective substrate with a thickness t1; a second light source for recording and/or reproducing information using a light flux with a wavelength $\lambda 2$ ($1.5 \times \lambda 1 \leq \lambda 2 \leq 1.7 \times \lambda 1$) emitted from the second light source for a second optical disc having a protective substrate with a thickness t2; a third light source for recording and/or reproducing information using a light flux with a wavelength $\lambda 3$ ($1.8 \times \lambda 1 \leq \lambda 3 \leq 2.2 \times \lambda 1$) emitted from the third light source for a third optical disc having a protective substrate with a thickness t3 ($1.9 \times t1 \leq t3 \leq 2.1 \times t1$); and the objective lens described in any one of Items 16 to 23.

The best mode to carrying out the invention will be explained in detail as follows, referring to drawings.

Figure 2:
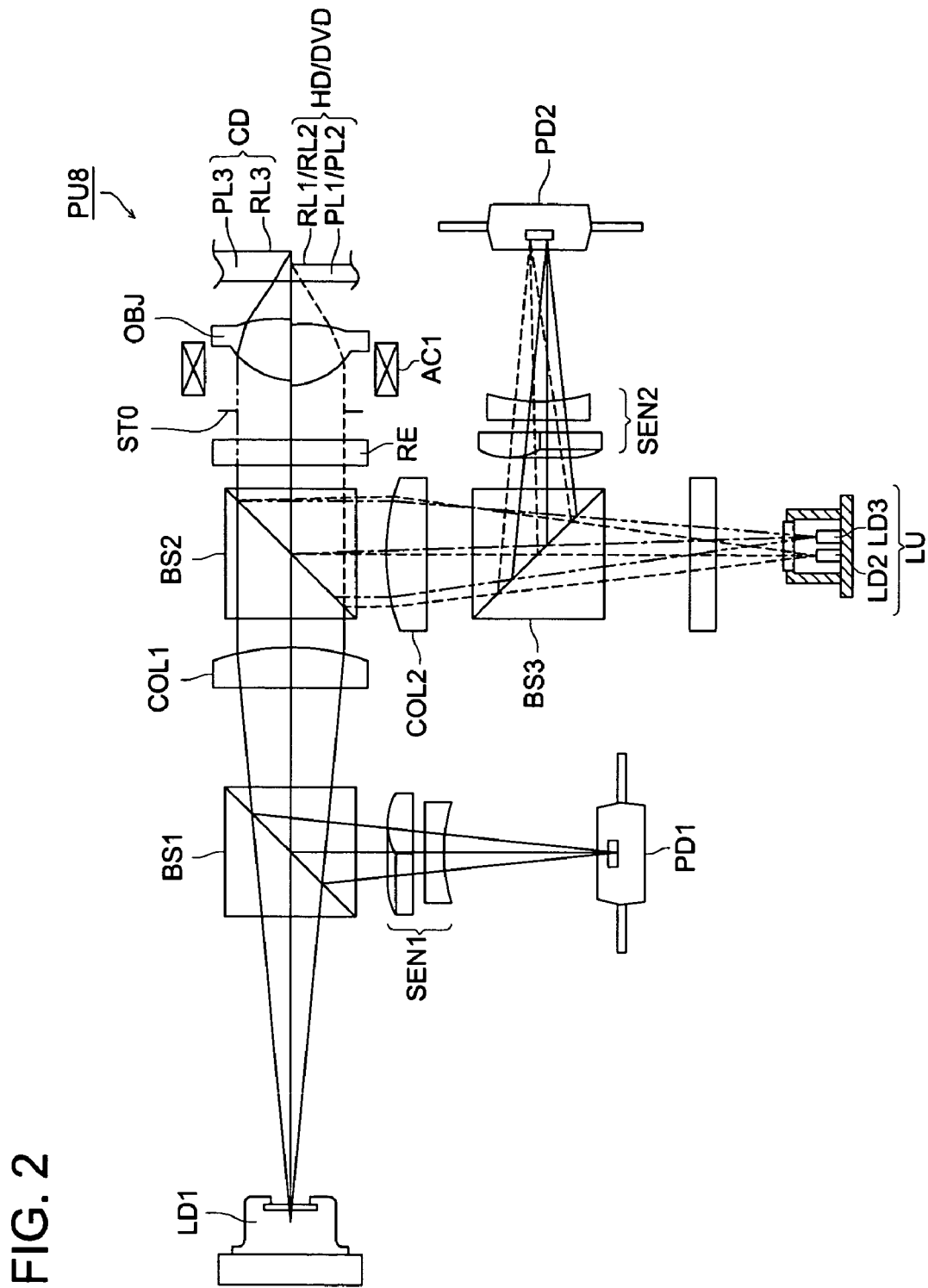
FIG. 2 is a top plan view of primary portions showing the structure of an optical pickup apparatus.

FIG. 2 is a diagram showing schematically the structure of optical pickup apparatus PU which can conduct only reproducing of information properly for HD (first optical disc) and can conduct reproducing and/or recording of information properly for DVD (second optical disc) and CD (third optical disc).

Optical specifications of HD include wavelength $\lambda 1=407$ nm, thickness t1 of protective layer (protective substrate) PL1=0.6 mm and numerical aperture NA1=0.65, optical specifications of DVD include wavelength $\lambda 2=655$ nm, thickness t2 of protective layer PL2=0.6 mm and numerical aperture NA2=0.65, and optical specifications of CD include wavelength $\lambda 3=785$ nm, thickness t3 of protective layer PL3=1.2 mm and numerical aperture NA3=0.51.

However, a combination of the wavelength, a thickness of a protective layer and a numerical aperture is not limited to the foregoing. Further, as the first optical disc, BD whose thickness t1 of protective layer PL1 is about 0.1 mm may also be used.

For m1, m2 and m3 each representing an optical system magnification of the objective lens, there are respectively relations of m1=0, $-\frac{1}{10} \leq m2 \leq -\frac{1}{100}$ and $-\frac{1}{10} \leq m3 \leq -\frac{1}{100}$. Namely, objective lens OBJ in the present embodiment has the structure wherein the first light flux enters as collimated light, while, each of the second and third light fluxes enters as gentle divergent light. In the invention, however, it is not always needed that optical system magnifications m1, m2 and m3 of the objective lens are in the aforesaid range.

Optical pickup apparatus PU includes violet semiconductor laser LD1 (first light source) that emits a laser light flux (first light flux) with wavelength of 407 nm when reproducing information for high density optical disc HD; photodetector PD1 for the first light flux; light source unit LU wherein red semiconductor laser LD2 (second light source) that emits a laser light flux (second light flux) with wavelength of 655 nm when conducting reproducing and/or recording of information for DVD and infrared semiconductor laser LD3 (third light source) that emits a laser light flux (third light flux) with wavelength of 785 nm when conducting reproducing and/or recording of information for CD are united solidly; photodetector PD2 that is common for the second and third light fluxes; first collimator lens COL1 through which the first light flux alone passes; second collimator lens COL2 through which the second and third light fluxes pass; objective lens OBJ having a function to converge laser light fluxes on information recording surfaces RL1, RL2 and RL3 wherein a diffractive structure is formed on its optical surface as a phase structure, and its both sides are aspheric surfaces; first beam splitter BS1; second beam splitter BS2; third beam splitter BS3; diaphragm STO; and lens sensors SEN1 and SEN2.

In the optical pickup apparatus PU, when reproducing information for HD, the violet semiconductor laser LD1 is first caused to emit light as its beam path is shown with solid lines in FIG. 2. A divergent light flux emitted from the violet semiconductor laser LD1 passes through the first beam splitter BS1 to arrive at the first collimator lens COL1.

Then, the first light flux is converted to collimated light when it is transmitted through the first collimator lens COL1, and passes through the second beam splitter BS2 and quarter wavelength plate RE to arrive at objective optical element OBJ, thus, it becomes a spot that is formed by objective lens OBJ on information recording surface RL1 through first protective layer PL1. Focusing and tracking for the objective lens OBJ are carried out by biaxial actuator AC1 arranged around the objective lens OBJ.

A reflected light flux modulated by information pits on information recording surface RL1 passes again through objective lens OBJ, quarter wavelength plate RE, second beam splitter BS2 and first collimator lens COL1, then, is branched on the first beam splitter BS1, and is given astigmatism by sensor lens SEN1 to be converged on a light-receiving surface of photodetector PD1. Thus, it is possible to read information recorded on HD by using output signals of photodetector PD1.

Further, when conducting reproducing and/or recording of information for DVD, red semiconductor laser LD2 is first caused to emit light as its beam path is shown with dotted lines in FIG. 2. A divergent light flux emitted from the red semiconductor laser LD2 passes through the third beam splitter BS3 to arrive at the second collimator lens COL2.

Then, the second light flux is converted to gentle divergent light when it is transmitted through the second collimator lens COL2, and is reflected on the second beam splitter BS2 to arrive at objective lens OBJ after passing through quarter wavelength plate RE, and it becomes a spot that is formed by objective lens OBJ on information recording surface RL2 through second protective layer PL2. Focusing and tracking for the objective lens OBJ are carried out by biaxial actuator AC1 arranged around the objective lens OBJ.

Or, the second light flux may also be converted into gentle convergent light when it is transmitted through the second collimator lens COL2, so that the convergent light is reflected on the second beam splitter BS2 to enter objective lens OBJ after passing through quarter wavelength plate RE.

A reflected light flux modulated by information pits on information recording surface RL2 passes again through objective lens OBJ and quarter wavelength plate RE, and after it is reflected on the second beam splitter BS2, it passes through collimator lens COL2 and is branched by third beam splitter BS3 to be converged on a light-receiving surface of photodetector PD2. Thus, it is possible to read information recorded on DVD by using output signals of photodetector PD2.

When conducting reproducing and/or recording of information for CD, the infrared semiconductor laser LD3 is first caused to emit light as its beam path is shown with two-dot chain lines in FIG. 2. A divergent light flux emitted from the infrared semiconductor laser LD3 passes through the third beam splitter BS3 to arrive at the second collimator lens COL2.

Then, the third light flux is converted to gentle divergent light when it is transmitted through the second collimator lens COL2, and is reflected on the second beam splitter BS2 to arrive at objective lens OBJ after passing through quarter wavelength plate RE, and it becomes a spot that is formed by objective lens OBJ on information recording surface RL3 through third protective layer PL3. Focusing and tracking for the objective lens OBJ are carried out by biaxial actuator Ac1 arranged around the objective lens OBJ.

A reflected light flux modulated by information pits on information recording surface RL3 passes again through objective lens OBJ and quarter wavelength plate RE, and after it is reflected on the second beam splitter BS2, it passes through collimator lens COL2 and is diverged by third beam splitter BS3 to be converged on a light-receiving surface of photodetector PD2. Thus, it is possible to read information recorded on CD by using output signals of photodetector PD2.

Next, a structure of objective lens OBJ will be explained.

Figure 3:
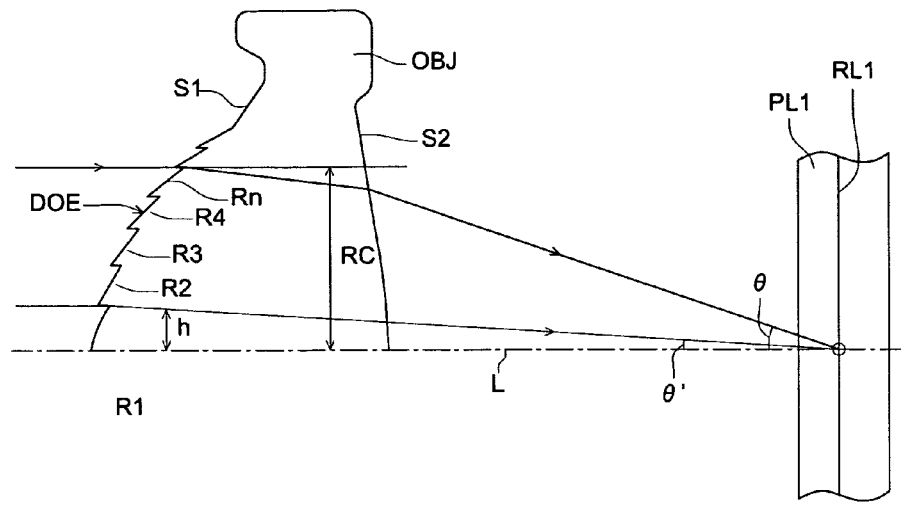
FIG. 3 is a top plan view of primary portions showing the structure of an objective lens.

As shown in FIG. 3, objective lens OBJ is a plastic single lens of a single-group single-element type.

Diffractive structure DOE is formed on common area RC used for reproducing of the first disc and for reproducing and/or recording of the second and third optical discs, on optical surface S1 of objective lens OBJ, and light-emerging surface S2 is a refractive interface.

The diffractive structure DOE includes plural ring-shaped zones R (R1 to Rn) in a shape of concentric circles each having their centers on optical axis L, and a cross-section of the diffractive structure including optical axis L is in a serrated shape.

The optical surface on which the diffractive structure is formed by air (medium A) closer to the light source and medium (medium B) of the objective lens closer to the optical disc, both existing respectively on both sides of the optical surface as a border. Since the refractive index of air is 1 for light having any wavelength, $n_{d2}-n_{d1}=n_1-n_2$ holds when $n_1$ represents the refractive index of the medium of the objective lens for light with wavelength $\lambda 1$, and $n_2$ represents the refractive index of the medium of the objective lens for light with wavelength $\lambda 2$. Therefore, $(n_{d2}-n_{d1})/(\lambda 2-\lambda 1)=(n_1-n_2)/(\lambda 2-\lambda 1)$ holds, and this indicates wavelength-dependency of the refractive index of medium B, and it satisfies $5.7\times 10^5 \leq |(n_{d2}-n_{d1})/(\lambda 2-\lambda 1)| \leq 9.0\times 10^5$.

Further, under the assumption that a step difference between a pair of ring-shaped zones in plural ring-shaped zones has a depth di [mm] parallel to the optical axis and a vertical distance hi [mm] from the optical axis, when the number m of the step differences between the ring-shaped zones is greater than 7, depth d parallel to the optical axis in the vertical distance hi from the optical axis is determined by using $C_{2k}$ (k is an integer from 0 to 5) obtained by approximating with a least squares method by the use of the following expression (1), and a whole of the step differences except step differences providing maximum and minimum differences between a calculated value of the depth d parallel to the optical axis at the vertical distance hi from the optical axis and di, are approximated again. When the number m of the step differences between the ring-shaped zones is equal to or smaller than 7, in the determination of the depth d parallel to the optical axis at a vertical distance hi from the optical axis, $C_{2k}$ (k is an integer from 0 to m−3) is obtained by approximating with the least squares method by using the following expression (2) instead of the expression (1). When the number of the calculated values of the depth d parallel to the optical axis at a vertical distance hi from the optical axis is 3 or less, a whole of the step differences are approximated again without removing the step differences providing the maximum and minimum differences between the calculated value of the depth d parallel to the optical axis at a vertical distance hi from the optical axis and di. The optical surface on which the aforesaid diffractive structure is formed, satisfies any one of:

$3.38 \leq \alpha \leq 3.45$, $5.37 \leq \alpha \leq 5.46$, $7.25 \leq \alpha \leq 7.39$, $9.38 \leq \alpha \leq 9.45$, and $11.41 \leq \alpha \leq 11.43$, where α is defined with $\alpha = C_0 \times |n_{d1}/\lambda 1|$ by using approximate coefficient $C_0$ which makes Pearson's correlation function R satisfy $0.99998 \leq R$ after these approximations.

$$di = \sum_{k=0}^{5}(C_{2k} \cdot h_i^{2k})(i = 1, 2, 3 \ldots m) \qquad (1)$$

$$di = \sum_{k=0}^{m-3}(C_{2k} \cdot h_i^{2k})(i = 1, 2, 3 \ldots m) \qquad (2)$$

In the aforesaid expression, $C_{2k}$ represents a constant, k represents an integer, i represents a natural number and m represents the number of the step differences each being between paired ring-shaped zones.

Figure 4:
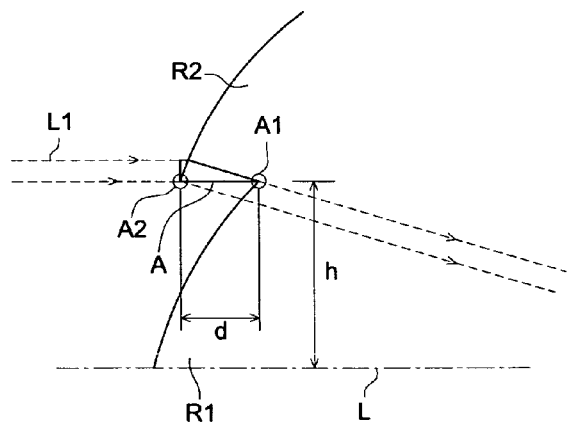
FIG. 4 is an enlarged top plan view of primary portions showing the structure of an objective lens.
Figure 5:
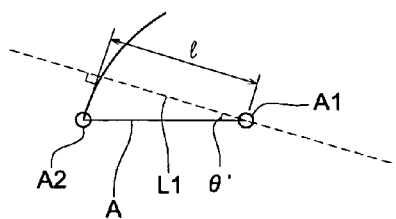
FIG. 5 is an enlarged top plan view of primary portions showing the structure of an objective lens.

As stated above, a depth parallel to the optical axis between ring-shaped zones is determined by the diffraction efficiencies for light fluxes with wavelengths λ1 to λ3. When blaze wavelength λB represents a wavelength of light that makes the diffraction efficiency to be 100%, and mB represents its diffraction order, the light flux that has passed through neighboring ring-shaped zones has an optical path length difference of λB×mB. The optical path length difference is a difference of a distance of light parallel to the direction of light, and an amount of step difference (=d, see FIG. 4) at the position that is away from each of the optical axis where the entering light flux and the emerging light flux for diffractive structure DOE forms an angle with the optical axis is shifted from $mB \times \lambda B/(n_A'-n_B')$ (=1 see FIG. 5) (where λB is blaze wavelength, $n_A'$ and $n_B'$ are refractive indexes of medium A and medium B for λB, mB is diffraction order of blaze wavelength). That amount of shifting is determined by an optical path difference function, when the diffractive structure is designed by the optical path difference function. Since an optical path difference function for correcting spherical aberration is usually expressed by the power series, the relation between height hi and depth di can also be expressed by the power series. Therefore, if the relation between di and hi is expressed by approximation of the aforesaid expression (1), $C_0$ that is a term of a constant results in representing an amount of the step difference in a imaginary occasion that the step differences are located at the position whose height is zero.

Incidentally, when a tip portion of a serration of the diffractive structure is rounded without being formed to be sharp in terms of angle through manufacturing errors, a point where an extended line of the optical surface and an extended line of the step intersect each other serves as a measure point of the aforesaid depth di.

Further, the aforesaid $C_0$ can also be expressed as $C_0 = mB \times \lambda B/(n_A'-n_B')$ (expression (2)), because an angle formed between the optical axis and an entering light flux or an emerging light flux for the diffractive structure DOE is zero, at the position where a height from the optical axis is zero.

In this case, when $n_A$ represents the refractive index of medium A for the light flux with wavelength λ1 [mm], $n_B$ represents the refractive index of medium B for the light flux with wavelength λ1 [mm], $\alpha = C_0 \times n_{d1}/\lambda 1$ can be modified to $C_0 = \alpha \times \lambda 1/n_{d1} = \alpha \times \lambda 1/(n_A - n_B)$ (expression (3)), and when expression (2) is compared with expression (3), $mB \neq \alpha$, namely, that α is shifted from mB (diffraction order (integer) of blaze wavelength) can be understood, from the relation of $\lambda B \neq \lambda 1$ and $n_A'-n_B' \neq n_A-n_B$.

Further, change of refractive index difference nd between medium A on the light entering side and medium B on the light emerging side $(n_{d2}-n_{d1})/(\lambda 2-\lambda 1)$ can be modified to $\{(n_A'-n_B')-(n_A-n_B)\}/(\lambda B-\lambda 1)$, and $57 \leq |(n_{d2}-n_{d1})/(\lambda 2-\lambda 1)| \leq 90$ is satisfied. Therefore, causing α to be within the aforesaid range is to limit the range of λB as a result.

Further, a shifting amount of α from mB becomes smaller when mB grows greater, because the decline of diffraction efficiency for changes in wavelength is greater for the higher order diffraction and it requires to enhance diffraction efficiency for light with wavelength λ1 under the condition of working wavelength $\lambda 1 \approx \lambda B$.

Since α is a numerical value close to mλ, an integer part of α is mλ.

If an optical path difference is exactly an integer multiple of wavelength λ1, the relation of α=an integer holds, and a decline of an amount of light that is caused when the first light flux passes through objective lens OBJ is controlled and an amount of light in substantially 100% can be secured, while in the case of α≠an integer, a decline of an amount of light corresponding to a value of α is caused.

Specifically, if ranges of $3.38 \leq \alpha \leq 3.45$, $5.37 \leq \alpha \leq 5.46$, $7.25 \leq \alpha \leq 7.39$, $9.38 \leq \alpha \leq 9.45$ and $11.41 \leq \alpha \leq 11.43$ are kept, sufficient amount of light can be secured for reproducing only of information for HD, although an amount of the first light flux is declined, and sufficient amount of light of the second and third light fluxes for reproducing and/or recording of information for DVD and CD can be secured.

Further, in diffractive structure DOE, distance d of the step difference is established so that an integer part of a may become an odd number (preferably 3), in other words, the step difference may give nearly odd multiples of wavelength λ1 to the first light flux. Owing to this, diffraction efficiency of diffracted light (for example, +third order diffracted light) whose diffraction order is an odd number for wavelength 407 nm (where refractive index for wavelength 407 nm of an objective lens on which the diffractive structure DOE is formed is 1.559806) becomes 100% substantially, and when the second light flux (where refractive index for wavelength 655 nm of an objective lens on which the diffractive structure DOE is formed is 1.540725) enters the diffractive structure DOE, +second order diffracted light with the diffraction efficiency of 88% is generated, whereby, sufficient diffraction efficiency can be obtained in all wavelength zones for the first and second light fluxes.

On the other hand, if the third light flux (where refractive index for wavelength 785 nm of an objective lens on which the diffractive structure DOE is formed is 1.537237) enters the diffractive structure DOE, +second order diffracted light and +third order diffracted light are generated under substantially the same diffraction efficiency which is about 40%. In this case, when an example that the second order diffracted light having a smaller amount of spherical aberration at the magnification identical to the optical system magnification m1 among these second order diffracted light and third order diffracted light is used for reproducing and/or recording for CD, is compared with an example that distance d of the step difference is set so as to give an optical path difference in nearly even multiples of wavelength λ1 to the first light flux, and a diffracted light having the maximum diffraction efficiency among third light fluxes generated in the course of passing through this diffractive structure, is used for reproducing and/or recording for CD, an optical system magnification for correcting spherical aberration is closer to zero in the former, and aberration caused in the course of tracking can be made smaller.

Further, the diffractive structure DOE is expressed by an optical path difference to be given to a transmission wave front by this structure, and this optical path difference is expressed by optical path difference function φ(h) (mm) defined by substituting prescribed coefficients in the following expression (Numeral 1), under the assumption that h (mm) represents a height in the direction perpendicular to the optical axis, $B_{2i}$ represents an optical path difference function coefficient and i represents a natural number.

$$\phi(h) = \sum_{i=0} B_{2i} h^{2i} \quad \text{[Numeral 1]}$$

In the present embodiment, $B_4$ in the expression of Numeral 1 is established to satisfy $B_4 < 0$, so that the diffractive structure DOE may have positive diffractive actions.

Meanwhile, it is preferable to satisfy $-1.0 \times 10^{-3} < B_4 < -1.0 \times 10^{-4}$, and it is more preferable to satisfy $-7.0 \times 10^{-4} < B_4 < -4.5 \times 10^{-4}$.

By establishing the diffractive structure DOE as stated above, it is possible to give positive diffractive actions to at least one light flux (the first light flux having wavelength λ1 in the present embodiment) among light fluxes having respectively wavelength λ1, wavelength λ2 and wavelength λ3 which pass through the diffractive structure, and to control an amount of changes of wavefront aberration caused by wavelength fluctuations of the first light flux resulting from ambient temperature changes, whereby, an objective lens excellent in temperature characteristics can be obtained.

Specifically, it is established so as to satisfy $\Delta W \leq 0.05$ where ΔW [λrms] is a wavefront aberration change amount generated when a wavelength of the light flux with wavelength λ1 is fluctuated by +5 nm by ambient temperature changes.

Further, it is preferable to cause the diffractive structure to have negative diffraction power, and due to this, chromatic aberration of the light flux with wavelength λ1 or with wavelength λ2 in the case of conducting reproducing and/or recording of information for HD and DVD can be corrected.

To be concrete, it is possible to correct chromatic aberration of the light flux having wavelength λ1, and to obtain objective lens OBJ excellent in wavelength characteristics, by setting diffractive structure DOE so as to satisfy |dfb/dλ|≤0.1 [μm/nm] where amount of change dfb/dλ at the position where the wavefront aberration in the optical axis direction per wavelength change of 1 nm for the light flux with wavelength λ1 is minimum. It is further possible to correct chromatic aberration of the light flux having wavelength λ2, and to obtain objective lens OBJ excellent in wavelength characteristics, by setting diffractive structure DOE so as to satisfy |dfb/dλ|≤0.1 [μm/nm] where amount of change dfb/dλ at the position where the wavefront aberration in the optical axis direction per wavelength change of 1 nm for the light flux with wavelength λ2 is minimum.

In the present embodiment, first light source LD1 and third light source LD3 are arranged separately each other and are arranged on optical axis L, whereby, sine conditions of objective lens OBJ are satisfied for a high density optical disc having a narrow tolerance.

Therefore, when a high density optical disc is used, even when gentle converged light, for example, enters objective lens OBJ, coma caused by tracking of objective lens OBJ is not problematic. Further magnification is smaller among magnification and sine conditions both causing coma in the case of tracking of objective lens OBJ, although sine conditions are not satisfied for CD because a protective layer thickness and an optical system magnification of the objective lens are different greatly each other for a high density optical disc. Therefore, coma becomes on the level to be used sufficiently for reproduction and/or recording, and an objective lens excellent in tracking characteristics can be obtained.

Incidentally, when coma in the case of tracking further needs to be corrected, a coma correcting element may be provided on the light source side of objective lens OBJ, or, a collimator lens or a coupling lens having a correcting function may be provided.

It is further possible to make an arrangement wherein aperture restricting element AP is arranged in the vicinity of optical surface S1 of objective lens OBJ as an aperture element for conducting aperture restriction corresponding to NA3, and the aperture restricting element AP and objective lens OBJ are driven solidly for tracking by a biaxial actuator.

On the optical surface of the aperture restricting element AP in this case, there is formed wavelength selection filter WF having wavelength-selectivity of transmittance. Since this wavelength selection filter WF has the wavelength-selectivity of transmittance wherein all wavelengths from the first wavelength λ1 to the third wavelength λ3 are transmitted in the area within NA3, and the third wavelength λ3 only is intercepted and the first wavelength λ1 and the second wavelength λ2 are transmitted in the area from NA3 to NA1, it is possible to conduct aperture restriction corresponding to NA3 with this wavelength-selectivity.

As a method of restriction an aperture, it is possible to employ not only a method to use wavelength selection filter WF but also a method to switch an aperture mechanically and a method to use liquid crystal phase control element LCD.

Though it is preferable, from the viewpoint of light weight and low price, that objective lens OBJ is made of plastic, it may also be made of glass from the viewpoint of moisture resistance and light stability. What is available on the market now is a refraction-type glass mold aspheric lens, but, if low-melting glass which is under development is used, a glass mold lens on which a diffractive structure is provided may also be manufactured. Further, in circumstances where optical plastics are under development, there is provided a material whose refractive index change caused by temperature variation is small. This material is one to reduce a temperature-caused change of refractive index of total resins by mixing inorganic microparticles having an opposite sign for temperature-caused refractive index change therein, and there is another material wherein dispersion of total resins is made small by mixing inorganic microparticles causing small dispersion, thus, it is more effective if the aforesaid materials are used for an objective lens for BD.

By forming a diffractive structure whose cross-section is serrated on an optical surface of an objective lens, and by setting it so that, for example, $5.37 \leq \alpha \leq 5.46$ may be satisfied, as shown in the present embodiment, it is possible to obtain an objective lens and an optical pickup apparatus which make it possible to conduct exclusively reproducing of information for the first optical disc and to conduct properly reproducing and/or recording of information for the second and third optical discs.

EXAMPLES

Next, an example of the objective lens shown in the aforesaid embodiment (Example 1) will be explained.

Lens data of the Example 1 are shown in Table 1.

TABLE 1

Example 1 Lens data

Focal length of objective lens

| $f_1 = 3.2$ mm | $f_2 = 3.29$ mm | $f_3 = 3.27$ mm |
|---|---|---|

Numerical aperture on the image surface side

| NA1: 0.65 | NA2: 0.65 | NA3: 0.51 |
|---|---|---|

Diffraction order of second surface

| n1: 3 | n2: 2 | n3: 2 |
|---|---|---|

Magnification

| m1: 0 | m2: 1/87.7 | m3: 0 |
|---|---|---|

| $i^{th}$ surface | ri | di (407 nm) | ni (407 nm) | di (655 nm) | ni (655 nm) | di (785 nm) | ni (785 nm) |
|---|---|---|---|---|---|---|---|
| 0 |  | ∞ |  | −285.98 |  | ∞ |  |
| 1(aperture diameter) | ∞ | 0.1 (φ4.16 mm) |  | 0.1 (φ4.23 mm) |  | 0.1 (φ3.33 mm) |  |
| 2 | 2.02281 | 1.90000 | 1.524392 | 1.90000 | 1.506498 | 1.90000 | 1.504969 |
| 3 | −9.30563 | 1.73 | 1.0 | 1.76 | 1.0 | 1.39 | 1.0 |
| 4 | ∞ | 0.6 | 1.61869 | 0.6 | 1.57752 | 1.2 | 1.57063 |
| 5 | ∞ |  |  |  |  |  |  |

*The symbol di expresses a displacement from $i^{th}$ surface to $(i+1)^{th}$ surface Aspheric surface data Second surface Aspheric surface coefficient

| κ | $-4.3775 \times E{-1}$ |
|---|---|
| A4 | $-1.7082 \times E{-3}$ |
| A6 | $-1.3798 \times E{-3}$ |
| A8 | $+5.7377 \times E{-4}$ |
| A10 | $-1.4792 \times E{-4}$ |
| A12 | $+1.9844 \times E{-5}$ |
| A14 | $-2.2752 \times E{-6}$ |

Optical path difference function
(blaze wavelength 461 nm)

| A2 | $-3.0692 \times E{-3}$ |
|---|---|
| A4 | $-4.4781 \times E{-4}$ |
| A6 | $-3.7423 \times E{-5}$ |
| A8 | $-2.9211 \times E{-6}$ |
| A10 | $+1.1336 \times E{-7}$ |

Third surface
Aspheric surface coefficient

| κ | $-1.9188 \times E{+2}$ |
|---|---|
| A4 | $-1.1883 \times E{-2}$ |
| A6 | $+1.3554 \times E{-2}$ |
| A8 | $-5.9377 \times E{-3}$ |
| A10 | $+1.3343 \times E{-3}$ |
| A12 | $-1.6015 \times E{-4}$ |
| A14 | $+8.0822 \times E{-6}$ |

As shown in Table 1, an objective lens of the example is an objective lens of a single lens type for HD/DVD/CD compatibility, and its focal length f1 is set to 3.20 mm, magnification m1 is set to 0 and NA1 is set to 0.65 when wavelength λ1 is 407 nm, its focal length f2 is set to 3.29 mm, magnification m2 is set to 1/87.7 and NA2 is set to 0.65 when wavelength λ2 is 655 nm, and its focal length f3 is set to 3.27 mm, magnification m3 is set to 0 and NA3 is set to 0.51 when wavelength λ3 is 785 nm.

The objective lens in the example is one manufactured by using "ZEONEX340R" (product name) made by ZEON Corporation as an optical material.

Each of the optical surface (second surface) on the light source side and the optical surface (third surface) on the optical disc side, both of the objective lens is formed to be an aspheric surface that is prescribed by the numerical expression wherein coefficients shown in Table 1 are substituted in the following Numeral 2, and is axis symmetry about optical axis L.

$$x = \frac{h^2/r}{1 + \sqrt{1-(1+\kappa)(h/r)^2}} + \sum_{i=2} A_{2i} h^{2i} \quad \text{[Numeral 2]}$$

In the aforesaid expression, x represents an axis (sign of light traveling direction is positive) in the optical axis direction, κ represents a conic constant and $A_{2i}$ represents an aspheric surface coefficient.

On each of the second and third surfaces, there is formed diffractive structure DOE. This diffractive structure DOE is expressed by an optical path difference that is given to a transmitting wavefront by the aforesaid structure. This optical path difference is expressed by optical path difference function φ(h) (mm) defined by substituting coefficients shown in Table 1 in the expression of the following numeral 3, under the assumption that h (mm) represents a height in the direction perpendicular to the optical axis, $B_{2i}$ represents an optical path difference function coefficient, n represents a diffraction order number of diffracted light having the maximum diffraction efficiency among diffracted lights of incident light flux, λ (nm) represents a wavelength of a light flux entering the diffractive structure, λB (nm) represents a manufacturing wavelength of the diffractive structure and λB represents blaze wavelength (1.0 mm in this example) of diffractive structure DOE.

[Numeral 3]
Optical Path Difference Function $$\phi(h) = \left(\sum_{i=0}^{5} A_{2i} h^{2i}\right) \times n \times \lambda / \lambda B$$

Incidentally, substituting ($A_{2i}$×n×λ/λB) represented in Numeral 3 by $B_{2i}$ provides aforesaid Numeral 1. Namely, the relation of $A_{2i}$×n×λ/λ=$B_{2i}$ holds.

Table 2 shows heights from the optical axis (vertical distance) of step differences between every pair of the ring-shaped zones in a plurality of ring-shaped zones, depths di of the step differences parallel to the optical axis, $C_0$ through $C_{10}$, values of approximate expression and values of R and α.

Values of $C_0$ through $C_{10}$ are those obtained by approximating with a least approximation method by the use of expression (1), concerning heights from the optical axis (vertical distance) of step differences between every pair of the ring-shaped zones and depths of step differences parallel to the optical axis. Further, values of the approximate expression are values of depths parallel to the optical axis at the vertical distance hi from the optical axis that are calculated by using $C_{2k}$ obtained by expression (1) and approximation. R represents a value of Pearson's correlation coefficient in the case where a step differences having the maximum and minimum differences between a value of the approximate expression and a value of di are excluded and all other step differences are approximated again by using expression (1).

TABLE 2

| Step difference No. | Height from optical axis [mm] | Depth of step difference [mm] | Value of approximate expression [mm] |
|---|---|---|---|
| 1 | 0.383414 | 0.002690 | 0.002690 |
| 2 | 0.536654 | 0.002709 | 0.002709 |
| 3 | 0.650749 | 0.002728 | 0.002728 |
| 4 | 0.744228 | 0.002746 | 0.002746 |
| 5 | 0.824369 | 0.002764 | 0.002764 |
| 6 | 0.894957 | 0.002782 | 0.002782 |
| 7 | 0.958263 | 0.002800 | 0.002800 |
| 8 | 1.01579 | 0.002818 | 0.002818 |
| 9 | 1.06858 | 0.002836 | 0.002836 |
| 10 | 1.1174 | 0.002853 | 0.002853 |
| 11 | 1.16286 | 0.002871 | 0.002871 |
| 12 | 1.20539 | 0.002888 | 0.002888 |
| 13 | 1.24537 | 0.002906 | 0.002906 |
| 14 | 1.2831 | 0.002923 | 0.002923 |
| 15 | 1.31883 | 0.002941 | 0.002941 |
| 16 | 1.35276 | 0.002958 | 0.002958 |
| 17 | 1.38506 | 0.002976 | 0.002976 |
| 18 | 1.4159 | 0.002993 | 0.002993 |
| 19 | 1.44539 | 0.003010 | 0.003010 |
| 20 | 1.47365 | 0.003028 | 0.003028 |
| 21 | 1.50078 | 0.003045 | 0.003045 |
| 22 | 1.52687 | 0.003062 | 0.003062 |
| 23 | 1.55199 | 0.003080 | 0.003080 |
| 24 | 1.57621 | 0.003097 | 0.003097 |
| 25 | 1.5996 | 0.003114 | 0.003114 |
| 26 | 1.62221 | 0.003131 | 0.003131 |
| 27 | 1.6441 | 0.003148 | 0.003148 |
| 28 | 1.66529 | 0.003165 | 0.003165 |

Coefficients of approximate expression (R = 1.0000)

| | |
|---|---|
| $C_0$ | 2.6710E−03 |
| $C_2$ | 1.2772E−04 |
| $C_4$ | 1.4265E−05 |
| $C_6$ | −1.8533E−06 |
| $C_8$ | 2.1583E−06 |
| $C_{10}$ | −3.5171E−07 |

α = $C_0$ × $n_{d1}$/λ1 = 0.002671 × (1.524392 − 1)/0.000407 = 3.441 (nd2 − nd1)/(λ2 − λ1) = {(1.506498 − 1) − (1.524392 − 1)}/(0.000655 − 0.000407) = −72.153

As shown in Table 2, the objective lens of this example is established so that a value of α calculated by using coefficient $C_0$ of the approximate expression in the case of R=1.0000 is 3.441, and it satisfies a relational expression of 3.38≦β≦3.45.

Next, an example (Example 2) of the objective lens shown in the aforesaid example will be explained.

Table 3 shows lens data of Example 2.

TABLE 3

Example 2 Lens data

| Focal length of objective lens | | |
|---|---|---|
| $f_1$ = 3.0 mm | $f_2$ = 3.10 mm | $f_3$ = 3.16 mm |
| Numerical aperture on the image surface side | | |
| NA1: 0.65 | NA2: 0.65 | NA3: 0.51 |
| Diffraction order of second surface | | |
| n1: 5 | n2: 3 | n3: 2 |
| Magnification | | |
| m1: 1/50.8 | m2: 1/49.3 | m3: −1/32.4 |

TABLE 3-continued

| $i^{th}$ surface | ri | di (407 nm) | ni (407 nm) | di (655 nm) | ni (655 nm) | di (785 nm) | ni (785 nm) |
|---|---|---|---|---|---|---|---|
| 0 | | −150.00 | | −150.00 | | 105.00 | |
| 1(aperture diameter) | ∞ | 0.1 (φ3.84 mm) | | 0.1 (φ3.97 mm) | | 0.1 (φ3.31 mm) | |
| 2 | 6.49242 | 1.00000 | 1.559806 | 1.00000 | 1.540725 | 1.00000 | 1.537237 |
| 3 | 11.40378 | 0.05 | 1.0 | 0.05 | 1.0 | 0.05 | 1.0 |
| 4 | 1.85946 | 1.80000 | 1.559806 | 1.80000 | 1.540725 | 1.80000 | 1.537237 |
| 5 | 29.37511 | 1.16 | 1.0 | 1.23 | 1.0 | 0.97 | 1.0 |
| 6 | ∞ | 0.6 | 1.61869 | 0.6 | 1.57752 | 1.2 | 1.57063 |
| 7 | ∞ | | | | | | |

*The symbol di expresses a displacement from $i^{th}$ surface to $(i + 1)^{th}$ surface Aspheric surface data

| Second surface |
|---|
| Aspheric surface coefficient |

| | |
|---|---|
| κ | −2.6300 × E+1 |
| A4 | +1.5183 × E−3 |
| A6 | +1.0648 × E−4 |
| A8 | +5.1422 × E−5 |
| A10 | −8.1669 × E−6 |

Optical path difference function
(blaze wavelength 435 nm)

| | |
|---|---|
| A2 | −2.5670 × E−3 |
| A4 | −1.3664 × E−4 |
| A6 | +2.5090 × E−5 |
| A8 | −5.3822 × E−6 |
| A10 | +2.7125 × E−7 |

Third surface
Aspheric surface coefficient

| | |
|---|---|
| κ | −1.0000 × E+2 |
| A4 | −2.9409 × E−3 |
| A6 | +1.2467 × E−3 |
| A8 | −7.4787 × E−5 |
| A10 | −2.0947 × E−6 |

Fourth surface
Aspheric surface coefficient

| | |
|---|---|
| κ | −3.4445 × E−1 |
| A4 | +4.3745 × E−3 |
| A6 | −7.0603 × E−4 |
| A8 | +4.8641 × E−4 |
| A10 | −5.9636 × E−5 |
| A12 | +1.1486 × E−5 |
| A14 | −1.8478 × E−6 |

Fifth surface
Aspheric surface coefficient

| | |
|---|---|
| κ | −2.7392 × E+2 |
| A4 | +2.6157 × E−2 |
| A6 | −2.3051 × E−2 |
| A8 | +2.1017 × E−2 |
| A10 | −1.3047 × E−2 |
| A12 | +4.3440 × E−3 |
| A14 | −5.9266 × E−4 |

As shown in Table 3, an objective lens of this is an objective lens of a two-group two-element type for HD/DVD/CD compatibility, and its focal length f1 is set to 3.00 mm, magnification m1 is set to 1/50.8 and NA1 is set to 0.65 when wavelength λ1 is 407 nm, its focal length f2 is set to 3.10 mm, magnification m2 is set to 1/49.3 and NA2 is set to 0.65 when wavelength λ2 is 655 nm, and its focal length f3 is set to 3.16 mm, magnification m3 is set to −1/32.4 and NA3 is set to 0.51 when wavelength λ3 is 785 nm.

The objective lens in the present embodiment is one manufactured by using "APEL" (product name) made by Mitsui Petrochemical Industries, Ltd. as an optical material.

Figure 6:
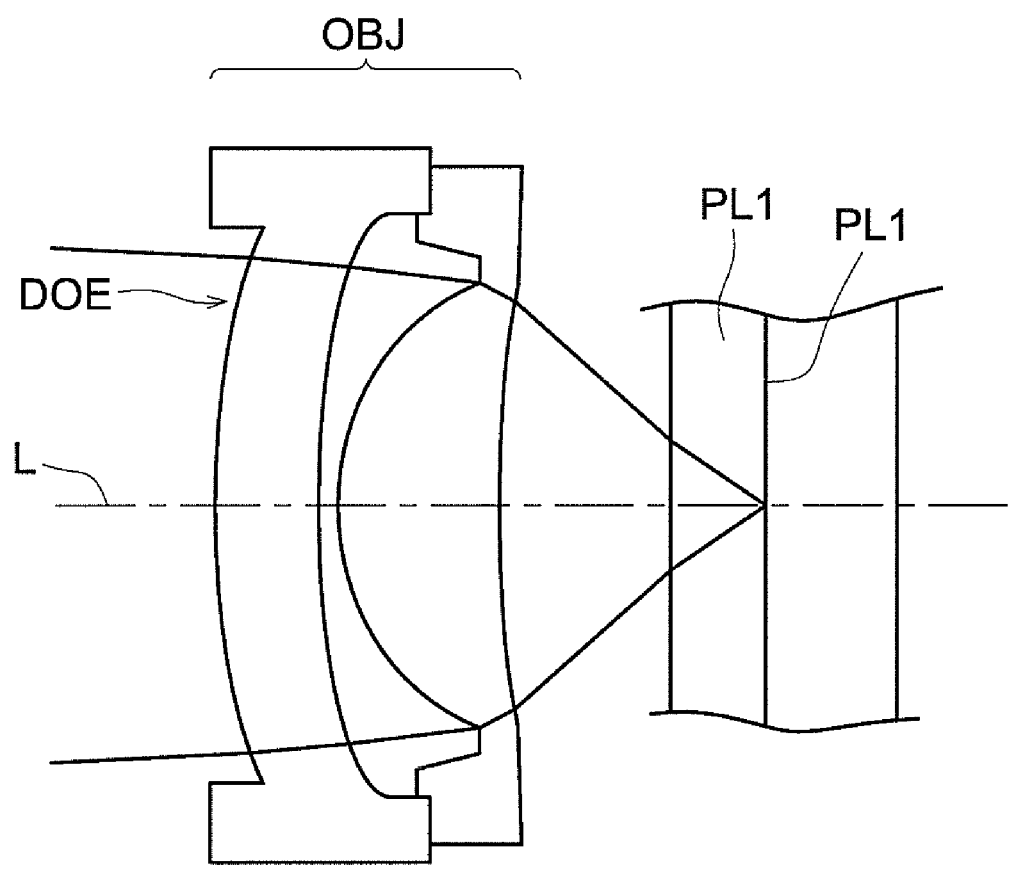
FIG. 6 is a top plan view of primary portions showing the structure of another example of an objective lens.

FIG. 6 shows the objective lens in Example 2. In two lenses forming the objective lens, each of the optical surface (second surface) arranged on the light source side and the optical surface (third surface) arranged on the optical disc side both in the lens arranged at the light source side and the optical surface (fourth surface) arranged on the light source side and the optical surface (fifth surface) arranged on the optical disc side both in the lens arranged at the optical disc side, is formed to be an aspheric surface that is prescribed by the numerical expression wherein coefficients shown in Table 3 are substituted for the aforesaid Numeral 2, and is axis symmetry about optical axis L.

On the second surface, there is formed diffractive structure DOE. This diffractive structure DOE is expressed by an optical path difference that is given to a transmitting wavefront by this structure. This optical path difference is expressed by optical path difference function $\phi(h)$ (mm) defined by substituting coefficients shown in Table 3 for the aforesaid Numeral 3 expression.

Table 4 shows heights from the optical axis (vertical distance) of step differences between every pair of the ring-shaped zones in a plurality of ring-shaped zones, depths di of the step differences parallel to the optical axis, $C_0$ through $C_{10}$, values of approximate expression and values of R and $\alpha$.

Values of $C_0$ through $C_{10}$ are those obtained by approximating with a least approximation method by the use of expression (1), concerning heights from the optical axis (vertical distance) of step differences between every pair of the ring-shaped zones and depths of step differences parallel to the optical axis. Further, values of the approximate expression are values of depths parallel to the optical axis at the vertical distance hi from the optical axis that are calculated by using $C_{2k}$ obtained by expression (1) and approximation. R represents a value of Pearson's correlation coefficient in the case where step differences having the maximum and minimum differences between a value of the approximate expression and a value of di are excluded and all other step differences are approximated again by using expression (1).

TABLE 4

| Step difference No. | Height from optical axis [mm] | Depth of step difference [mm] | Value of approximate expression [mm] |
|---|---|---|---|
| 1 | 0.409878 | 0.003918 | 0.003918 |
| 2 | 0.577354 | 0.003923 | 0.003923 |
| 3 | 0.704508 | 0.003927 | 0.003927 |
| 4 | 0.8107 | 0.003931 | 0.003931 |
| 5 | 0.903464 | 0.003935 | 0.003935 |
| 6 | 0.986674 | 0.003938 | 0.003938 |
| 7 | 1.06263 | 0.003942 | 0.003942 |
| 8 | 1.13284 | 0.003945 | 0.003945 |
| 9 | 1.19834 | 0.003948 | 0.003948 |
| 10 | 1.25989 | 0.003952 | 0.003952 |
| 11 | 1.31803 | 0.003955 | 0.003955 |
| 12 | 1.37323 | 0.003959 | 0.003959 |
| 13 | 1.42581 | 0.003962 | 0.003962 |
| 14 | 1.47606 | 0.003966 | 0.003966 |
| 15 | 1.52421 | 0.003969 | 0.003969 |
| 16 | 1.57043 | 0.003973 | 0.003973 |
| 17 | 1.6149 | 0.003977 | 0.003977 |
| 18 | 1.65774 | 0.003981 | 0.003981 |

Coefficients of approximate expression (R = 1.0000)

| | |
|---|---|
| $C_0$ | 3.9123E−03 |
| $C_2$ | 3.7087E−05 |
| $C_4$ | −1.9130E−05 |
| $C_6$ | 1.1579E−05 |
| $C_8$ | −3.4096E−06 |
| $C_{10}$ | 4.1753E−07 |

$\alpha = C_0 \times n_{d1}/\lambda 1 = 0.0039123 \times (1.559806 - 1)/0.000407 = 5.381$
$(nd2 - nd1)/(\lambda 2 - \lambda 1) = \{(1.540725 - 1) - (1.559806 - 1)\}/(0.000655 - 0.000407) = -76.940$ As shown in Table 4, the objective lens of this example is established so that a value of $\alpha$ calculated by using coefficient $C_0$ of the approximate expression in the case of R=1.0000 is 5.381, and it satisfies a relational expression of $5.37 \leq \alpha \leq 5.46$.

The expression of Pearson's correlation coefficient (least squares method) is shown in Numeral 4.

$$R = \frac{\sum_i (h_i - \overline{h})(d_i - \overline{d})}{\sqrt{\sum_i (h_i - \overline{h})^2} \sqrt{\sum_i (d_i - \overline{d})^2}}$$ [Numeral 4]

INDUSTRIAL APPLICABILITY

The present invention provides an objective lens for use in an optical pickup apparatus exclusively reproducing information for a high density optical disc and reproducing and/or recording information for the other two types of optical discs, with excellent wavelength characteristics and tracking characteristics, and an optical pickup apparatus employing this objective lens.

The invention claimed is:

1. An objective lens for an optical pickup apparatus at least reproducing information using a light flux with a wavelength $\lambda 1$ emitted from a first light source for a first optical disc having a protective substrate with a thickness t1, recording and/or reproducing information using a light flux with a wavelength $\lambda 2$ ($1.5 \times \lambda 1 \leq \lambda 2 \leq 1.7 \times \lambda 1$) emitted from a second light source for a second optical disc having a protective substrate with a thickness t2, and recording and/or reproducing information using a light flux with a wavelength $\lambda 3$ ($1.8 \times \lambda 1 \leq \lambda 3 \leq 2.2 \times \lambda 1$) emitted from a third light source for a third optical disc having a protective substrate with a thickness t3 ($1.9 \times t1 \leq t3 \leq 2.1 \times t1$), the objective lens comprising:

at least one optical surface including a common area for reproducing information for the first disc and for recording and/or reproducing information for the second and third discs; and a diffractive structure arranged on the common area, having a cross section in a serrated shape and divided into a plurality of ring-shaped zones whose centers are on an optical axis, wherein when the optical surface including the diffractive structure forms a border, a refractive index difference $n_{d1}$ for a light flux with the wavelength $\lambda 1$ between a medium A arranged at a light source side of the optical surface and a medium B arranged at an optical disc side of the optical surface, and refractive index difference $n_{d2}$ for a light flux with the wavelength $\lambda 2$ between the medium A and the medium B satisfies $57 \leq |(n_{d2}-n_{d1})/(\lambda 2-\lambda 1)| \leq 90$, and wherein when the plurality of ring-shaped zones have step differences between every pair of the ring-shaped zones each having a depth di [mm] parallel to an optical axis and a vertical distance hi [mm] from the optical axis, the objective lens satisfies any one of:

$3.38 \leq \alpha \leq 3.45$, $5.37 \leq \alpha \leq 5.46$, $7.25 \leq \alpha \leq 7.39$, $9.38 \leq \alpha \leq 9.45$, and $11.41 \leq \alpha \leq 11.43$, where α is defined by $$\alpha = C_0 \times |n_{d1}/\lambda 1|$$

using an approximate coefficient $C_0$ which makes a Pearson's correlation coefficient R satisfy $0.99998 \leq R$ when, for the step differences whose number m satisfies m>7 arranged between every pair of the ring-shaped zones, a depth d parallel to the optical axis at a vertical distance hi from the optical axis is approximated by a least squares method using a following expression (1) to obtain $C_{2k}$ (k is an integer in a range of 0 to 5) and is determined by using $C_{2k}$, and a whole of the step differences except step differences providing maximum and minimum differences between a calculated value of the depth d parallel to the optical axis at the vertical distance hi from the optical axis and di, are approximated again using the expression (1), wherein for the step differences whose number m satisfies $m \leq 7$ arranged between every pair of the ring-shaped zones, when the depth d parallel to the optical axis at a vertical distance hi from the optical axis is determined, $C_{2k}$ (k is an integer in a range of 0 to m−3) is obtained by approximating by the least squares method using a following expression (2) instead of the expression (1), and wherein when a number of the calculated values of the depth d parallel to the optical axis at a vertical distance hi from the optical axis is 3 or less, a whole of the step differences including the step differences providing the maximum and minimum differences between the calculated value of the depth d parallel to the optical axis at a vertical distance hi from the optical axis and di, are further approximated, where $$di = \sum_{k=0}^{5} (C_{2k} \cdot h_i^{2k})(i = 1, 2, 3 \ldots m), \quad (1)$$

$$di = \sum_{k=0}^{m-3} (C_{2k} \cdot h_i^{2k})(i = 1, 2, 3 \ldots m), \quad (2)$$

$C_{2k}$ is a constant, k is an integer, i is a natural number, and m is a number of the step differences between every pair of the ring-shaped zones.

2. The objective lens of claim 1,
wherein α has an integer part of 3.

3. The objective lens of claim 1,
wherein the objective lens is formed of two lenses.

4. The objective lens of claim 3,
wherein the diffractive structure is on a lens arranged at a light source side between the two lenses.

5. The objective lens of claim 1,
wherein the objective lens satisfies $$60 \leq |(n_{d2}-n_{d1})/(\lambda 2-\lambda 1)| \leq 80.$$

6. The objective lens of claim 1,
wherein the diffractive structure is defined by using an optical path difference function φ(h) where $$\phi(h) = B_2 \times h^2 + B_4 \times h^4 + \ldots + B_{2i} \times h^{2i}, \text{ and}$$

$$B_4 < 0$$

where $B_{2i}$ is a coefficient of the optical path difference function and i is a natural number.

7. The objective lens of claim 1,
wherein the diffractive structure has a negative diffractive power.

8. The objective lens of claim 7,
wherein a change amount of a position dfb/dλ where a wavefront aberration is minimum along the optical axis in the objective lens for a light flux with the wavelength λ1 per a wavelength change of 1 nm satisfies $$|dfb/d\lambda| \leq 0.1 \, [\mu m/nm],$$

where fb is a distance between the objective lens and the first optical disc.

9. The objective lens of claim 7,
wherein a change amount of a position dfb/dλ where a wavefront aberration is minimum along the optical axis in the objective lens for a light flux with the wavelength λ2 per a wavelength change of 1 nm satisfies $$|dfb/d\lambda| \leq 0.1 \, [\mu m/nm],$$

wherein fb is a distance between the objective lens and the second optical disc.

10. The objective lens of claim 1,
wherein, among optical system magnifications m1, m2, and m3 of the objective lens for the wavelength λ1, λ2 and λ3, m1=0 and at least one of m2 and m3 satisfies a following expression:

$$1/100 < |m| \leq 1/10.$$

11. The objective lens of claim 1,
wherein t1=t2.

12. The objective lens of claim 1,
wherein a focal length f1 of the objective lens for a light flux with the wavelength λ1 satisfies $$0.8 \text{ mm} \leq f1 \leq 4.0 \text{ mm}.$$

13. The objective lens of claim 1,
wherein the objective lens is formed of a plastic.

14. The objective lens of claim 1,
wherein the objective lens satisfies $0.9 \times t1 \leq t2 \leq 1.1 \times t1$.

15. The objective lens of claim 1,
wherein one of the medium A and medium B is an air and the other is a lens material of the lens including the diffractive structure.

16. An objective lens for an optical pickup apparatus, at least reproducing information using a light flux with a wavelength λ1 emitted from a first light source for a first optical disc having a protective substrate with a thickness t1, recording and/or reproducing information using a light flux with a wavelength λ2 ($1.5 \times \lambda 1 \leq \lambda 2 \leq 1.7 \times \lambda 1$) emitted from a second light source for a second optical disc having a protective substrate with a thickness t2, and recording and/or reproducing information using a light flux with a wavelength λ3 ($1.8 \times \lambda 1 \leq \lambda 3 \leq 2.2 \times \lambda 1$) emitted from a third light source for a third optical disc having a protective substrate with a thickness t3 ($1.9 \times t1 \leq t3 \leq 2.1 \times t1$), the objective lens comprising:

at least one optical surface having a common area for reproducing information for the first disc and for recording and/or reproducing information for the second and third discs; and a diffractive structure arranged on the common area whose diffraction efficient of the light flux with a wavelength λ1 for the first optical disc is 50% or more, and whose diffraction efficient of a light flux with the wavelength λ2 for the second optical disc is 70% or more, wherein when the optical surface including the diffractive structure forms a border, a refractive index difference $n_{d1}$ for a light flux with the wavelength λ1 between a medium A arranged at a light source side of the optical surface and a medium B arranged at an optical disc side of the optical surface, and refractive index difference $n_{d2}$ for a light flux with the wavelength λ2 between the medium A and the medium B satisfy $$57 \leq |(n_{d2}-n_{d1})/(λ2-λ1)| \leq 90.$$

17. The objective lens of claim 16,
wherein the objective lens is formed of two lenses.

18. The objective lens of claim 17,
wherein the diffractive structure is on a lens arranged at a light source side between the two lenses.

19. The objective lens of claim 16,
wherein the objective lens satisfies $$60 \leq |(n_{d2}-n_{d1})/(λ2-λ1)| \leq 80.$$

20. An objective lens for an optical pickup apparatus, at least reproducing information using a light flux with a wavelength λ1 emitted from a first light source for a first optical disc having a protective substrate with a thickness t1, recording and/or reproducing information using a light flux with a wavelength λ2 (1.5×λ1≦λ2≦1.7×λ1) emitted from a second light source for a second optical disc having a protective substrate with a thickness t2, and recording and/or reproducing information using a light flux with a wavelength λ3 (1.8×λ1≦λ3≦2.2×λ1) emitted from a third light source for a third optical disc having a protective substrate with a thickness t3 (1.9×t1≦t3≦2.1×t1), the objective lens comprising:

at least one optical surface having a common area for reproducing information for the first disc and for recording and/or reproducing information for the second and third discs; and a diffractive structure arranged on the common area whose diffraction efficient of the light flux with a wavelength λ1 for the first optical disc is 50% or more, and whose diffraction efficient of a light flux with the wavelength λ2 for the second optical disc is 70% or more, wherein the diffractive structure has a cross section in a serrated shape and is divided into a plurality of ring-shaped zones whose centers are on an optical axis, and wherein when the plurality of ring-shaped zones have step differences between every pair of the ring-shaped zones each having a depth di [mm] parallel to an optical axis and a vertical distance hi [mm] from the optical axis, the objective lens satisfies any one of:

3.38≦α≦3.45, 5.37≦α≦5.46, 7.25≦α≦7.39, 9.38≦α≦9.45, and 11.41≦α≦11.43, where α is defined by $$α=C_0 \times |n_{d1}/λ1|$$

using an approximate coefficient $C_0$ which makes a Pearson's correlation coefficient R satisfy 0.99998≦R when for the step differences whose number m satisfies m>7 arranged between every pair of the ring-shaped zones, a depth d parallel to the optical axis at a vertical distance hi from the optical axis is approximated by a least squares method using a following expression (1) to obtain $C_{2k}$ (k is an integer in a range of 0 to 5) and is determined by using $C_{2k}$, and a whole of the step differences except step differences providing maximum and minimum differences between a calculated value of the depth d parallel to the optical axis at the vertical distance hi from the optical axis and di, are further approximated using the expression (1), wherein for the step differences whose number m satisfies m≦7 arranged between every pair of the ring-shaped zones, when the depth d parallel to the optical axis at a vertical distance hi from the optical axis is determined, $C_{2k}$ (k is an integer in a range of 0 to m −3) is obtained by approximating by the least squares method using a following expression (2) instead of the expression (1), and wherein when a number of the calculated values of the depth d parallel to the optical axis at a vertical distance hi from the optical axis is 3 or less, a whole of the step differences including the step differences providing the maximum and minimum differences between the calculated value of the depth d parallel to the optical axis at a vertical distance hi from the optical axis and di, are approximated again, where $$di = \sum_{k=0}^{5}(C_{2k} \cdot h_i^{2k})(i=1,2,3...m), \quad (1)$$

$$di = \sum_{k=0}^{m-3}(C_{2k} \cdot h_i^{2k})(i=1,2,3...m), \quad (2)$$

$C_{2k}$ is a constant, k is an integer, i is a natural number, and m is a number of the step differences between every pair of the ring-shaped zones.

21. The objective lens of claim 20,
wherein α has an integer part of 3.

22. The objective lens of claim 20,
wherein the objective lens is formed of two lenses.

23. the objective lens of claim 22,
wherein the diffractive structure is on a lens arranged at a light source side between the two lenses.

24. An optical pickup apparatus comprising:

a first light source emitting a light flux with a wavelength λ1 for reproducing information using the light flux with the wavelength λ1 for a first optical disc having a protective substrate with a thickness t1;

a second light source emitting a light flux with a wavelength λ2 (1.5×λ1≦λ2≦1.7×λ1) for recording and/or reproducing information using the light flux with the wavelength λ2 for a second optical disc having a protective substrate with a thickness t2;

a third light source emitting a light flux with a wavelength λ3 (1.8×λ1≦λ3≦2.2×λ1) for recording and/or reproducing information using the light flux with the wavelength λ3 for a third optical disc having a protective substrate with a thickness t3 (1.9×t1≦t3≦2.1×t1); and the objective lens of claim 1.

25. An optical pickup apparatus comprising:

a first light source emitting a light flux with a wavelength λ for reproducing information using the light flux with the wavelength λ1 for a first optical disc having a protective substrate with a thickness t1;

a second light source emitting a light flux with a wavelength λ2 (1.5×λ1≦λ2≦1.7×λ1) for recording and/or reproducing information using the light flux with the wavelength λ2 for a second optical disc having a protective substrate with a thickness t2;

a third light source emitting a light flux with a wavelength λ3 (1.8×λ1≦λ3≦2.2×λ1) for recording and/or reproducing information using the light flux with the wavelength λ3 third optical disc having a protective substrate with a thickness t3 (1.9×t1≦t3≦2.1×t1); and the objective lens of claim 16.

26. An optical pickup apparatus comprising:

a first light source emitting a light flux with a wavelength λ1 for reproducing information using the light flux with the wavelength λ1 for a first optical disc having a protective substrate with a thickness t1;

a second light source emitting a light flux with a wavelength λ2 (1.5×λ1≦λ2≦1.7×λ1) for recording and/or reproducing information using the light flux with the wavelength λ2 for a second optical disc having a protective substrate with a thickness t2;

a third light source emitting a light flux with a wavelength λ3 (1.8×λ1≦λ3≦2.2×λ1) for recording and/or reproducing information using the light flux with the wavelength λ3 for a third optical disc having a protective substrate with a thickness t3 (1.9×t1≦t3≦2.1×t1); and the objective lens of claim 19.

* * * * *